United States Patent
Sivaratri et al.

(10) Patent No.: US 12,039,880 B2
(45) Date of Patent: Jul. 16, 2024

(54) SYSTEMS AND METHODS FOR TRAINING AIRCRAFT OPERATORS

(71) Applicant: Honeywell International Inc., Morris Plains, NJ (US)

(72) Inventors: Mahesh Sivaratri, Bangalore (IN); Raghu Shamasundar, Bangalore (IN); Srihari Jayathirtha, Bangalore (IN); Kalimulla Khan, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 615 days.

(21) Appl. No.: 16/901,544

(22) Filed: Jun. 15, 2020

(65) Prior Publication Data
US 2021/0390879 A1    Dec. 16, 2021

(51) Int. Cl.
*G09B 19/16*    (2006.01)
*G09B 9/08*    (2006.01)

(52) U.S. Cl.
CPC ............ *G09B 19/165* (2013.01); *G09B 9/08* (2013.01)

(58) Field of Classification Search
CPC . G09B 9/04; G09B 9/042; G09B 9/08; G09B 9/165
See application file for complete search history.

(56) References Cited

U.S. PATENT DOCUMENTS

| 2014/0134578 A1* | 5/2014 | Clark | ................. G09B 5/06 434/219 |
| 2016/0358498 A1* | 12/2016 | Fucke | ................. G09B 9/16 |
| 2018/0165979 A1* | 6/2018 | Correia Gracio | ................. G06Q 10/06398 |

FOREIGN PATENT DOCUMENTS

EP    3229220 A1 *    10/2017

OTHER PUBLICATIONS

"Flight Data Monitoring on ATR Aircraft 2016," ATR Training Center (44 pages).

* cited by examiner

*Primary Examiner* — Robert J Utama
(74) *Attorney, Agent, or Firm* — Alston & Bird LLP (57) ABSTRACT

A computer-implemented method may be used for training aircraft operators. The method may include determining a set of recommended flight training topics for a target aircraft operator, and receiving flight data recorded from simulator training performed by the aircraft operator or operation of aircraft by the aircraft operator. Additionally, the method may include analyzing the flight data to determine a proficiency evaluation, the proficiency evaluation being a measure of proficiency of the aircraft operator in one or more training topics, and adjusting the set of recommended flight training topics based on proficiency evaluation.

17 Claims, 4 Drawing Sheets

SYSTEMS AND METHODS FOR TRAINING AIRCRAFT OPERATORS

TECHNICAL FIELD

Various embodiments of the present disclosure relate generally to systems and methods for providing avionics training and, more particularly, to monitoring the effectiveness of the avionics training.

BACKGROUND

Safety Management Systems (SMS) are being adopted by the aviation industry worldwide. SMS for product and serves providers and regulators will integrate modern safety risk management and safety assurance concepts into repeatable, proactive systems. SMSs emphasize safety management as a fundamental business process to be considered in the same manner as other aspects of business management. Whenever a threat to flight safety is identified, the SMS will provide framework for assessing risk. Currently, changes in procedure go into training suites; however, there is no verification system to determine how to translate SMS events to the training system.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section

SUMMARY OF THE DISCLOSURE

According to certain aspects of the disclosure, systems and methods are disclosed for training aircraft operators with a closed loop monitoring system.

In one embodiment, a computer-implemented method is disclosed for training aircraft operators. The computer-implemented method may comprise: determining a set of recommended flight training topics for a target aircraft operator; receiving flight data recorded from simulator training performed by the aircraft operator or operation of aircraft by the aircraft operator; analyzing the flight data to determine a proficiency evaluation, the proficiency evaluation being a measure of proficiency of the aircraft operator in one or more training topics; and adjusting the set of recommended flight training topics based on proficiency evaluation.

In accordance with another embodiment, a computer-implemented system is disclosed for training aircraft operators. The computer-implemented system may comprise: a memory having processor-readable instructions stored therein; and at least one processor configured to access the memory and execute the processor-readable instructions, which when executed by the at least one processor configure the at least one processor to perform: determining a set of recommended flight training topics for a target aircraft operator; receiving flight data recorded from simulator training performed by the aircraft operator or operation of aircraft by the aircraft operator; analyzing the flight data to determine a proficiency evaluation, the proficiency evaluation being a measure of proficiency of the aircraft operator in one or more training topics; and adjusting the set of recommended flight training topics based on proficiency evaluation.

In accordance with another embodiment, a non-transitory computer-readable medium for training aircraft operators, the non-transitory computer-readable medium storing instruction that, when executed by at least one processor, may configure the at least one processor to perform determining a set of recommended flight training topics for a target aircraft operator; receiving flight data recorded from simulator training performed by the aircraft operator or operation of aircraft by the aircraft operator; analyzing the flight data to determine a proficiency evaluation, the proficiency evaluation being a measure of proficiency of the aircraft operator in one or more training topics; and adjusting the set of recommended flight training topics based on proficiency evaluation.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

As discussed above, a safety management system (SMS) is a systematic approach to managing safety, including the necessary organizational structures, accountabilities, policies, and procedures. The SMS may provide a structured management approach to control safety risks in operations. Flight data monitoring (FDM) or Flight Data Analysis (FDA) may be the systematic, proactive use of digital flight data from flight operations to improve aviation safety within an intrinsically non-punitive and safety culture. FDM programs may assist an operator in identifying, quantifying, assessing, and addressing operational risks. FDM may be an integral part of an airline's SMS and supports the four main components of the SMS.

Professional pilots receive recurrent training periodically to keep them current with the emergency procedures, normal line operations, new equipment, and standards. However, the outcomes of FDM events and/or incidents analysis resulting in the training recommendations may not be linked to the trainings.

Therefore, a need exists for a system to monitor the effectiveness of training received by pilots and crew. The current disclosure describes systems and methods in which the effectiveness of training is continuously assessed for conformity to the specifications based on safety data analytics and event precursors. Furthermore, based on the flight events and investigations, when specific training curriculum at the airline level and individual personnel level is devised, a need exists for a closed loop system to evaluate if the crew is receiving adequate training in the identified areas. Additionally, a need exits to monitor and ensure the crew is exposed to similar operational environment where deficiencies existed historically and how the crew's performance has improved or deteriorated. This monitoring may be essential for the SMS to evaluate the effectiveness of the implemented safety barriers and further refine actions and course corrections. The system may also monitor the airline operations to continuously monitor the effectiveness of the training and may alert appropriate parties for immediate actions when deteriorations are determined.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Figure 1:
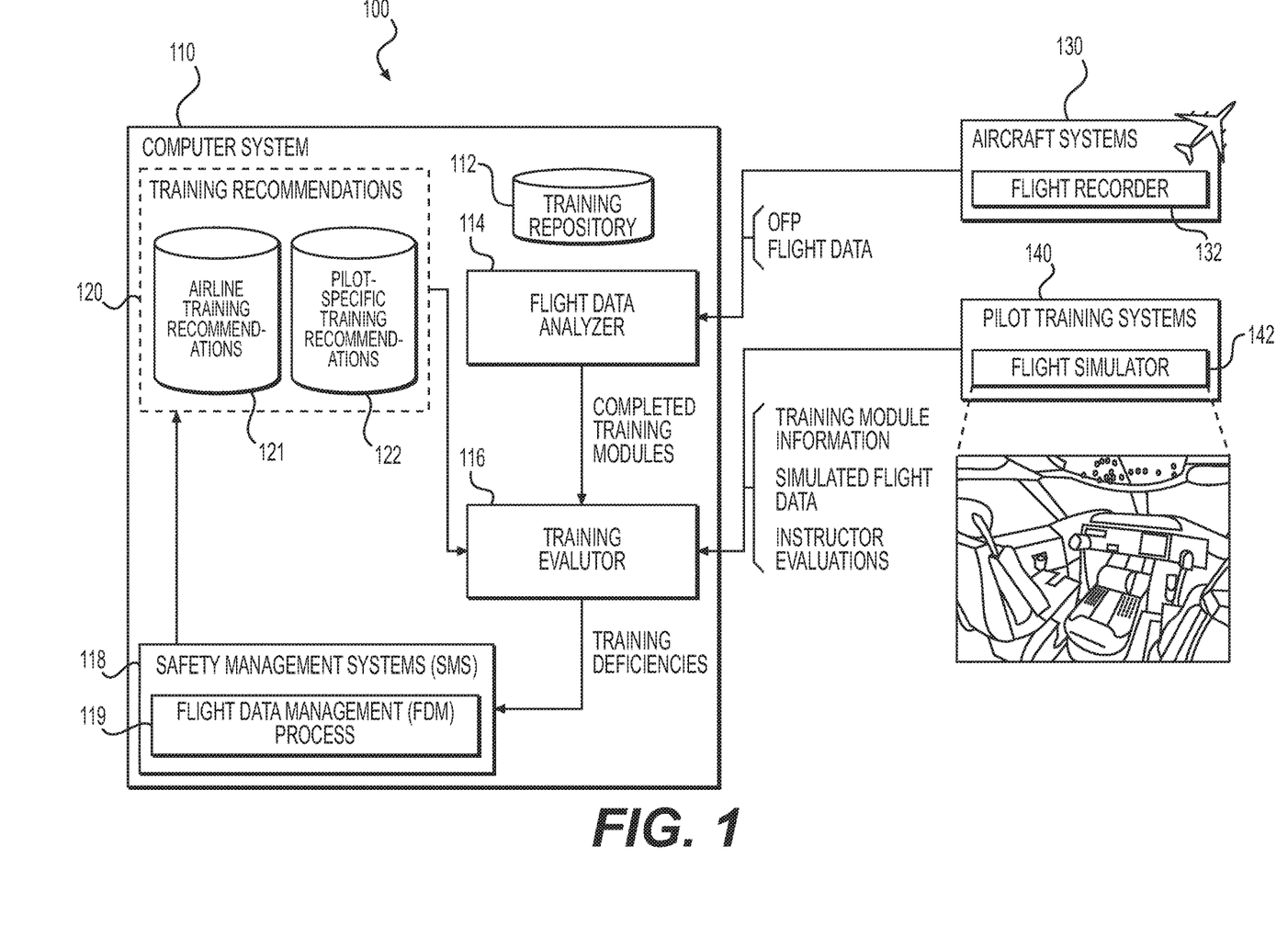
FIG. 1 depicts an exemplary environment in which systems, methods, and other aspects of the present disclosure may be implemented.

Referring now to the appended drawings, FIG. 1 depicts an exemplary environment 100 in which systems, methods, and other aspects of the present disclosure may be implemented. Environment 100 may include computer system 110, aircraft systems 130, and pilot training systems 140. Computer system 110 may include a training repository 112, flight data analyzer 114, training evaluator 116, safety management system (SMS) 118, and training recommendations engine 120. The training repository 112 may store categorized training plans. The SMS 118 may also include a flight data management (FDM) process module 119, and the training recommendation engine 120 may include an airline training recommendations engine 121, and pilot-specific training recommendations engine 122. The airline training recommendations engine 121 and pilot-specific training recommendations engine 122 may store and output recommended trainings for the airline (121), or store and output recommended trainings for specific pilot or personnel (122). The aircraft systems 130 may include a flight recorder 132. The pilot training systems 140 may include a flight simulator 142.

The close loop verification process will be described herein with regards to environment 100. Aircraft systems 130 and flight recorder 132 may be located on an aircraft and collects various aircraft data, for example, the operational flight plan, flight data, sensor data, etc. The various collected aircraft data may be transmitted and inputted into the flight data analyzer 114. During the airline operations, flight data may be processed to identify the various training scenarios that may have been executed successfully by the pilot. If these trainings are part of the SMS/FDM training plans, the trainings may be removed from the list of pending trainings to be executed during the recurrent training modules. The evidence of the airline flight data is inputted to FDM for close loop monitoring.

The pilot training system 140 and flight simulator 140 may be located on an aircraft, where training may be conducted using the physical controls of the aircraft. In another embodiment, the pilot training system 140 and flight simulator 140 may be located remote from the aircraft, for example at an airline facility, wherein training may be conducted using simulated controls and software. Data collected from the pilot training system 140 and flight simulator 142 may include training module information, simulated flight data, instructor evaluations, and other training related data. The data collected from the pilot training system 140 and flight simulator 142 may then be transmitted and inputted into the training evaluator 116. During simulator training, the simulator sessions may be recorded either manually or through a recording system, and the simulator sessions may be evaluated against the list of training recommendations pending for the pilot undergoing the training. The training evaluator 116 may generate any deficiencies identified in the training and loops them back to the FDM process module 119 as a feedback.

The FDM process module 119 may record the outcome of the recurrent training and may recommend to the training recommendations engine 120 any missing trainings as future recommendations for upcoming trainings. The FDM system may also contain a mechanism to communicate and report pending trainings to the appropriate parties for corrective actions. The training plans may be derived from the SMS/FDM process through statistical analysis of trends within the airline. The result of SMS/FDM statistical analysis may be categorized as generic, meaning applicable to all pilots operating a certain type of aircraft. The results may also be categorized to be targeted to specific pilots. These training categorizations may be stored in the airline training recommendations engine 121 and pilot specific training recommendations engine 122 respectively. Additional categorization may also be available, and may include a city pair, maintenance cycle, replacements, route, special procedures, etc. These additional categorizations may be stored in the training repository 112.

As indicated above, FIG. 1 is provided merely as an example. Other examples are possible and may differ from what was described with regard to FIG. 1. The number and arrangement of devices and networks shown in FIG. 1 are provided as an example. In practice, there may be additional devices, fewer devices and/or networks, different devices and/or networks, or differently arranged devices and/or networks than those shown in FIG. 1. Furthermore, two or more devices shown in FIG. 1 (e.g., SMS 118 and FDM 119) may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
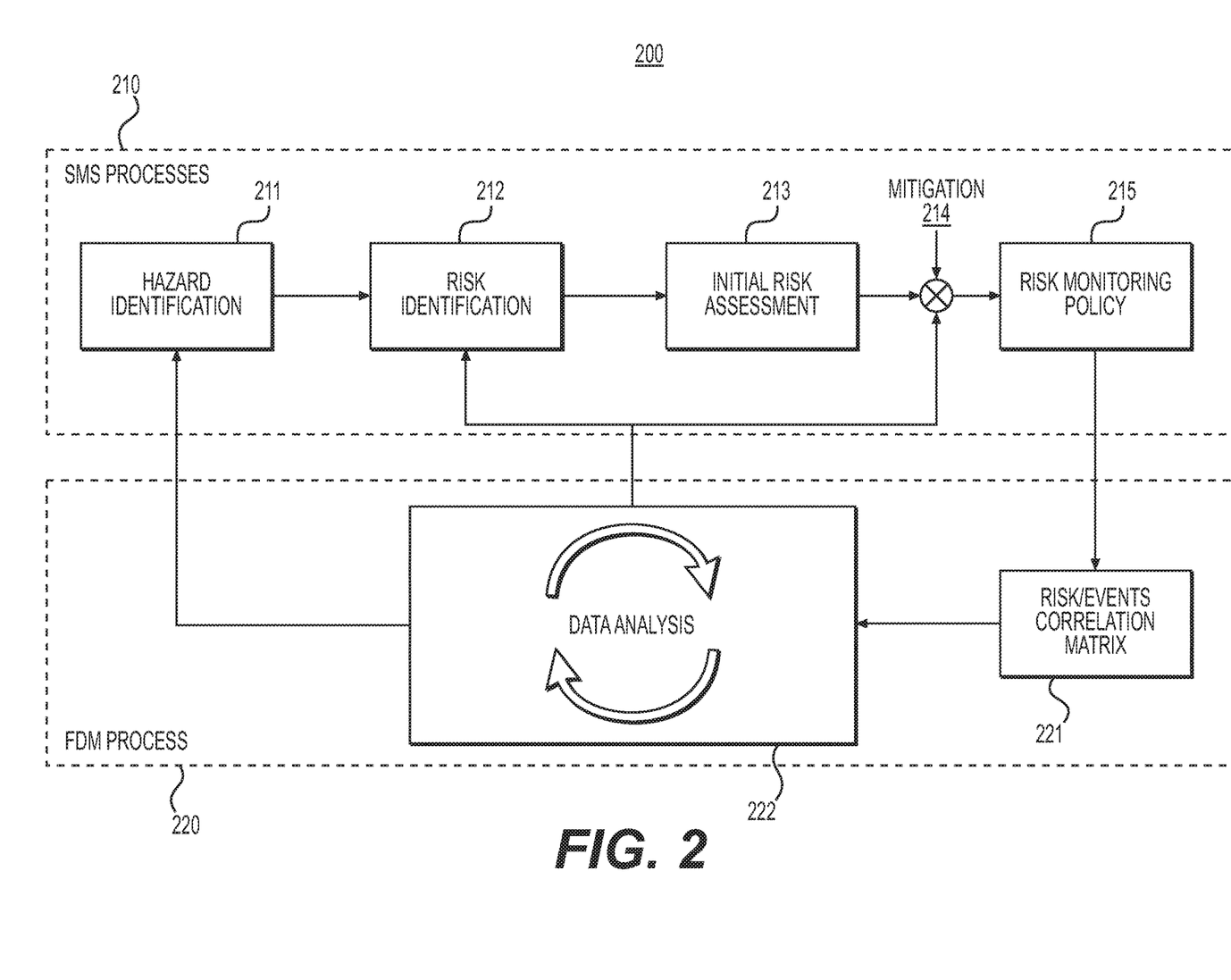
FIG. 2 depicts an exemplary flowchart of Safety Management System (SMS) and Flight data monitoring (FDM) process, according to one aspect of the present disclosure.

FIG. 2 depicts an exemplary flowchart 200 of Safety Management System (SMS) and Flight data monitoring (FDM) process, according to one aspect of the present disclosure. The flowchart 200 may include SMS processes 210 and FDM processes 220. The SMS processes may begin at step 211 where hazard identification process may be performed to identify any hazards from flight data and training data. At step 212, a risk process may be performed to identify any risks from the flight data and training data. At step 213 an initial risk assessment may be performed based on the identified hazards and the identified risk and at step 214 a mitigation process may be performed to mitigate the identified hazards and risks. Upon the completion of the mitigation process, a risk monitoring policy may be developed at step 215 to establish the standards for monitoring risks. The risk monitoring policy may be transmitted to the FDM process at step 221 where the identified risks and events may be correlated and inputted into an correlation matrix. The correlation matrix may contain the identified risks and the associated events that may cause the identified risks. The correlation matrix may then by transmitted for data analysis at step 222, the analysis may identify hazards, risks, and mitigation process, and may transmit the analysis results back to SMS processes 210 for continuous closed loop monitoring and process.

Although FIG. 2 shows example blocks, in some implementations, flowchart 200 may include additional blocks, fewer blocks, different blocks, or differently arranged blocks than those depicted in FIG. 2. Additionally, or alternatively, two or more of the blocks of flowchart 200 may be performed in parallel.

Figure 3:
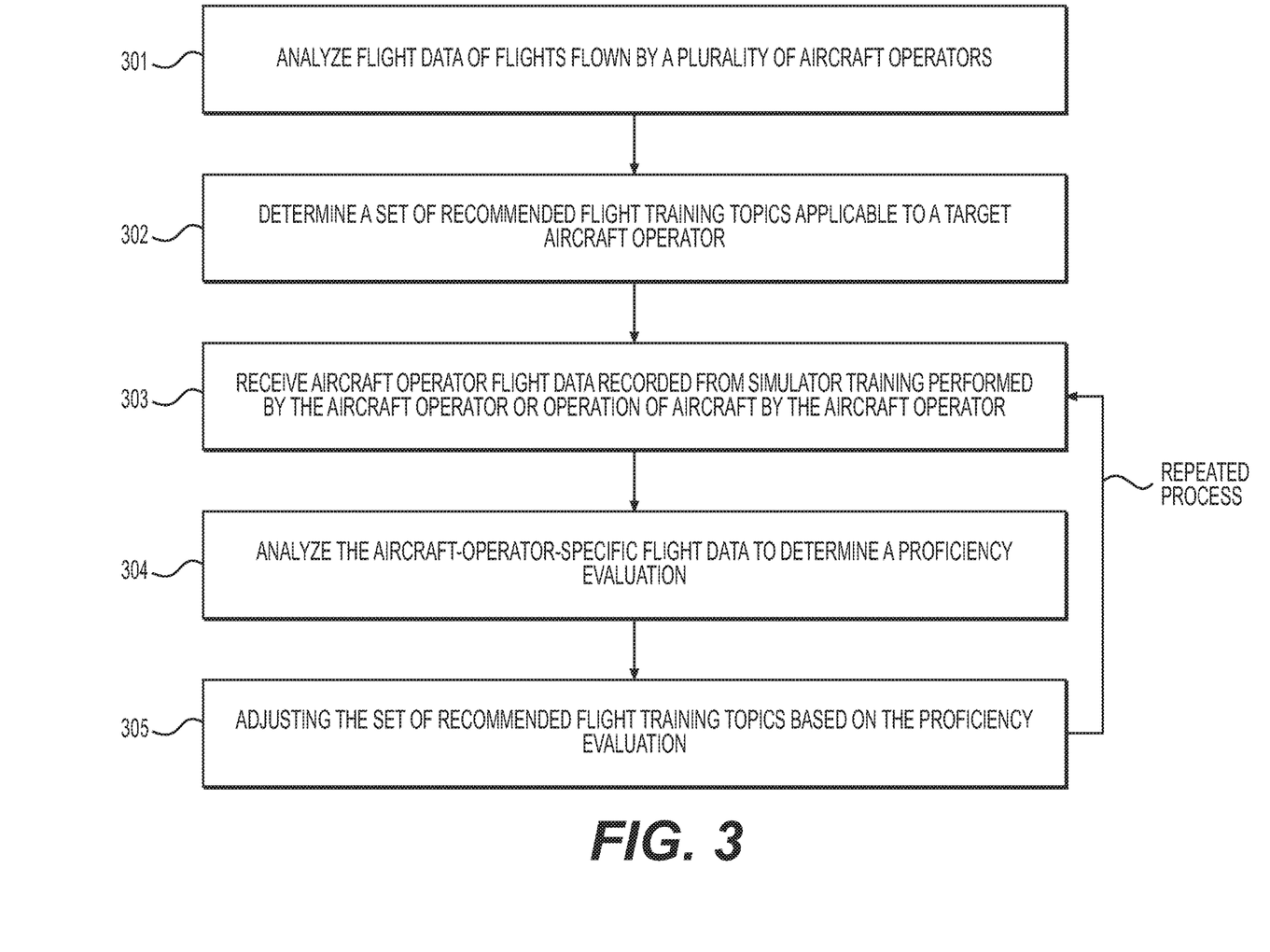
FIG. 3 depicts an exemplary method of the flight data monitoring process with simulation feedback, according to one aspect of the present disclosure.

FIG. 3 depicts an exemplary method 300 of the flight data monitoring process, according to one aspect of the present disclosure. Method 300 may begin at step 301 where flight data acquired from flights flown by a plurality of aircraft operators may be analyzed. At step 302, based on the analysis of the flight data, a set of recommended flight training topics applicable to a target aircraft operator may be determined. At step 303, aircraft operator flight data recorded from simulation training performed by the aircraft operator or operator flight data recorded from operation of aircraft by the aircraft operator may be received and upon receiving the operator flight data, the aircraft operator specific flight data may be analyzed in step 304 to determine a proficiency evaluation. Upon the determination of the proficiency evaluation, adjustments may be made on the set of recommended flight training topics based on the proficiency evaluation may be made at step 305. For example, if the proficiency evaluation indicates that the aircraft operator have successfully executed the training then the training topic may be removed from the set of recommended flight training topics. If the proficiency evaluation indicates that the aircraft operator did not successfully execute the training, then the training topic may remain in the set of recommended flight training topics for the aircraft operator to execute again. The adjustment process 305 may be repeated continuously based on the a repetition of steps 303 and 304 to continuously receive and evaluate the effectiveness of aircraft operator training.

Although FIG. 3 shows example blocks, in some implementations, method 300 may include additional blocks, fewer blocks, different blocks, or differently arranged blocks than those depicted in FIG. 3. Additionally, or alternatively, two or more of the blocks of method 300 may be performed in parallel.

Figure 4:
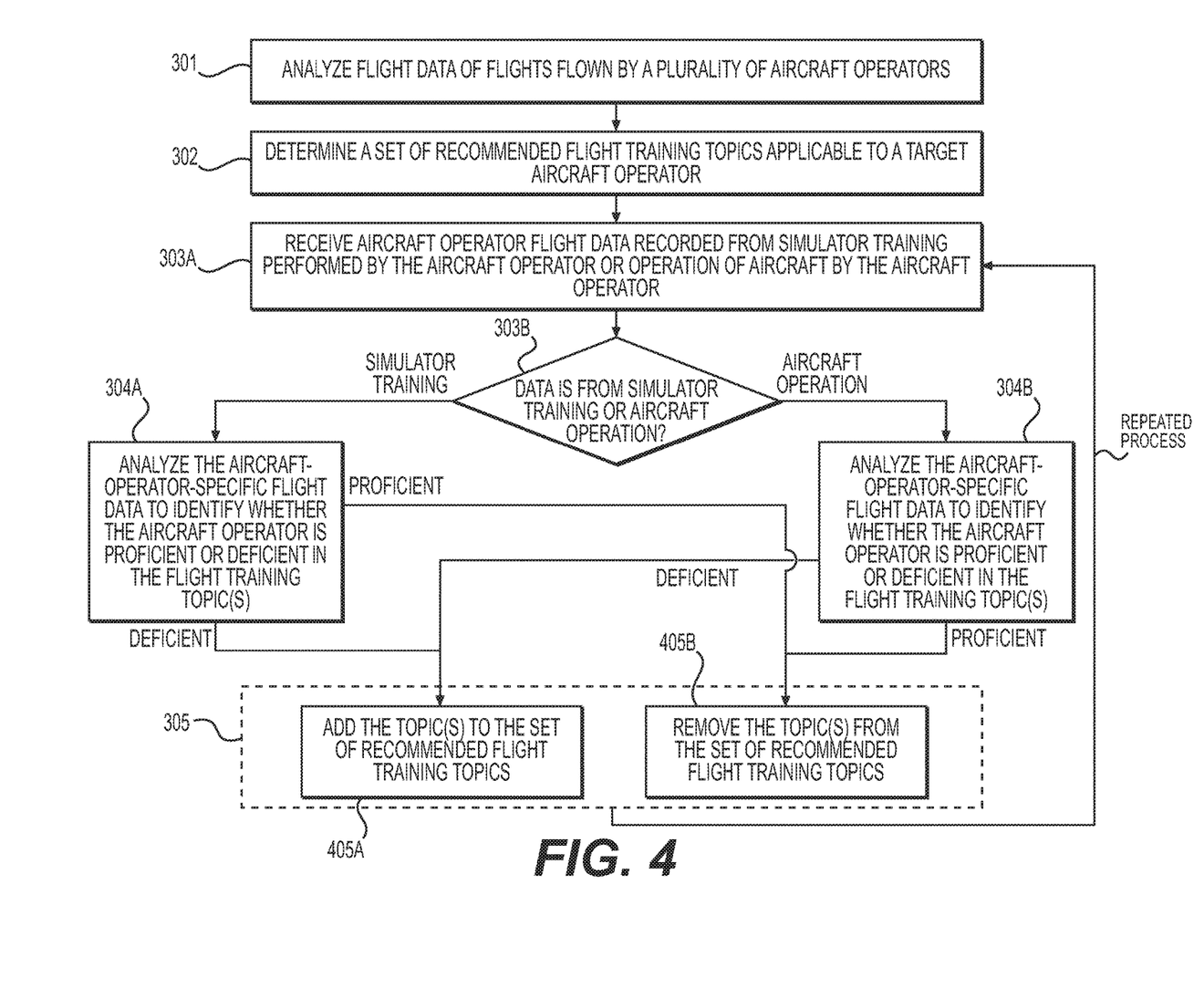
FIG. 4 depicts another exemplary method of the flight data monitoring with simulation feedback, according to one aspect of the present disclosure.

FIG. 4 depicts another exemplary method 400 of the flight data monitoring with simulation feedback, according to one aspect of the present disclosure. Method 400 may include additional processing steps to the exemplary method 300 described above with respect to FIG. 3. Method 400 may begin at step 301 where flight data acquired from flights flown by a plurality of aircraft operators may be analyzed. At step 302, based on the analysis of the flight data, a set of recommended flight training topics applicable to a target aircraft operator may be determined. At step 303A, aircraft operator flight data recorded from simulation training performed by the aircraft operator or operator flight data recorded from operation of aircraft by the aircraft operator may be received and upon receiving the operator flight data a determination may be performed at step 303B to determine if the data is from simulator training or aircraft operation. If the data is determined to be from simulator training then at step 304A, the aircraft-operator specific flight data may be analyzed to identify whether the aircraft operator is deficient or proficient in the flight training topic(s). If the aircraft-operator is deficient in the flight training topic(s) then at step 405A the deficient flight training topic(s) may be added to the set of recommended flight training topics. If the aircraft-operator is proficient in the flight training topic(s) then at step 405(B), the proficient flight training topic(s) may be removed from the set of recommended flight training topics. If at step 303B it is determined that the data is from aircraft operation, then at step 304B, the aircraft-operator specific flight data may be analyzed to identify whether the aircraft operator is deficient or proficient in the flight training topic(s). If the aircraft-operator is deficient in the flight training topic(s) then at step 405A the deficient flight training topic(s) may be added to the set of recommended flight training topics. If the aircraft-operator is proficient in the flight training topic(s) then at step 405(B), the proficient flight training topic(s) may be removed from the set of recommended flight training topics. The adjustment process 305, which includes adding or removing topic(s) from the set of recommended flight training topics, may be repeated continuously based on the a repetition of steps 303A, 303B, 304A and 304B to continuously receive and evaluate the effectiveness of aircraft operator training.

Although FIG. 4 shows example blocks, in some implementations, method 300 may include additional blocks, fewer blocks, different blocks, or differently arranged blocks than those depicted in FIG. 4. Additionally, or alternatively, two or more of the blocks of method 400 may be performed in parallel.

Embodiments of the present disclosure, or portions thereof, may be implemented, e.g., as computer-readable code, with a computer device or system. Additionally, each of the exemplary computer servers, databases, user interfaces, modules, and methods described above with respect to FIGS. 1-4 can be implemented in the computer device or system using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-4.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-4, may be implemented using the computer device or system. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

The computer device or system may include a central processing unit (CPU). CPU may be any type of processor device including, for example, any type of special purpose or a general-purpose microprocessor device. As will be appreciated by persons skilled in the relevant art, CPU also may be a single processor in a multi-core/multiprocessor system, such system operating alone, or in a cluster of computing devices operating in a cluster or server farm. CPU may be connected to a data communication infrastructure, for example, a bus, message queue, network, or multi-core message-passing scheme.

The computer device or system also may include a main memory, for example, random access memory (RAM), and also may include a secondary memory. Secondary memory, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory may include other similar means for allowing computer programs or other instructions to be loaded into the computer device or system. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to the computer device or system.

The computer device or system also may include a communications interface ("COM"). Communications interface allows software and data to be transferred between the computer device or system and external devices. Communications interface may include a modem, a network interface (such as an Ethernet card), a communications port, a PCMCIA slot and card, or the like. Software and data transferred via communications interface may be in the form of signals, which may be electronic, electromagnetic, optical, or other signals capable of being received by communications interface. These signals may be provided to communications interface via a communications path of the computer device or system, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. The computer device or system also may include input and output ports to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for training aircraft operators, the method comprising:
   analyzing, from one or more aircraft systems separate from one or more pilot training systems, sensor data from actual flight data of flights flown by a plurality of aircraft operators to obtain a flight data analysis, wherein the one or more pilot training systems comprises flight training topics identified based on a statistical analysis of trends and are stored in a safety management system, and wherein the sensor data from actual flight data is accessible from a flight recorder on an aircraft during flight operations;
   determining a target aircraft operator having one or more characteristics in common with one or more aircraft operators among the plurality of aircraft operators;
   determining a set of recommended flight training topics for the target aircraft operator based on the flight data analysis of the one or more aircraft operators that has one or more characteristics in common with the aircraft operator;
   providing the determined set of recommended flight training topics for the target aircraft operator to the one or more pilot training systems;
   receiving, from the one or more pilot training systems, simulator flight data recorded from simulator training performed by the target aircraft operator;
   receiving, from one or more aircraft systems separate from the one or more pilot training systems and during current flight operations, sensor data from actual flight data from operation of aircraft by the target aircraft operator;
   analyzing the received simulator flight data and the received actual flight data to identify received simulator flight data and received actual flight data that is related to the set of recommended flight training topics;
   determining a proficiency evaluation of the aircraft operator based on a combination of the received simulator flight data and the received actual flight data identified as related to the set of recommended flight training topics, the proficiency evaluation being a measure of proficiency of the target aircraft operator in one or more training topics as measured during actual flight and simulator fight; and
   adjusting the determined set of recommended flight training topics for the target aircraft operator, based on the determined proficiency evaluation;
   adjusting, during flight operations, the one or more pilot training systems based on the received simulator flight data and received actual flight data related to the target aircraft operator and the plurality of aircraft operators; and
   transmitting, to the safety management system, the adjusted one or more pilot training system.

2. The method of claim 1, wherein
   the proficiency evaluation identifies one or more flight training topics in which the aircraft operator is deficient, and
   the adjusting the set of recommended flight training topics include adding the one or more identified training topics to the set of recommended flight training topics.

3. The method of claim 1, wherein
   the proficiency evaluation identifies one or more flight training topics in which the aircraft operator is proficient, and
   the adjusting the set of recommended flight training topics include removing the one or more identified training topics from the set of recommended flight training topics.

4. The method of claim 1, wherein the one or more characteristics in common includes having operated a particular type or sub-type of aircraft.

5. The method of claim 1, wherein the set of recommended flight training topics is customized based on aircraft operators.

6. The method of claim 1, wherein the adjusting the set of recommended flight training topics based on proficiency evaluation is performed until the proficiency evaluation identifies the set of recommended flight training topics as proficient.

7. A computer-implemented system for training aircraft operators, the computer-implemented system comprising:
   a memory having processor-readable instructions stored therein; and
   at least one processor configured to access the memory and execute the processor-readable instructions, which when executed by the at least one processor configure the at least one processor to perform a method including:
   analyzing, from one or more aircraft systems separate from one or more pilot training systems, sensor data from actual flight data of flights flown by a plurality of aircraft operators to obtain a flight data analysis, wherein the one or more pilot training systems comprises flight training topics identified based on statistical analysis of trends and are stored in a safety management system, and wherein the sensor data from actual flight data is accessible from a flight recorder on an aircraft during flight operations;
   determining a target aircraft operator having one or more characteristics in common with one or more aircraft operators among the plurality of aircraft operators;
   determining a set of recommended flight training topics for the target aircraft operator based on the flight data analysis of the one or more aircraft operators that has one or more characteristics in common with the aircraft operator;

providing the determined set of recommended flight training topics for the target aircraft operator to the one or more pilot training systems;

receiving, from the one or more pilot training systems, simulator flight data recorded from simulator training performed by the target aircraft operator;

receiving, from one or more aircraft systems separate from the one or more pilot training systems and during current flight operations, sensor data from actual flight data from operation of aircraft by the target aircraft operator;

analyzing the received simulator flight data and the received actual flight data to identify received simulator data and received actual flight data that is related to the set of recommended flight training topics and determine a proficiency evaluation of the aircraft operator, the proficiency evaluation based on a combination of the received simulator flight data and the received actual flight data identified as related to the set of recommended flight training topics and being a measure of proficiency of the aircraft operator in one or more training topics as measured during actual flight and simulator flight; and adjusting the determined set of recommended flight training topics for the target aircraft operator, based on the determined proficiency evaluation, so that the one or more pilot training systems is adjusted, during flight operations, based on the actual flight data of flights flown by the plurality of aircraft operators.

8. The computer-implemented system of claim 7, wherein the proficiency evaluation identifies one or more flight training topics in which the aircraft operator is deficient, and the adjusting the set of recommended flight training topics include adding the one or more identified training topics to the set of recommended flight training topics.

9. The computer-implemented system of claim 7, wherein the proficiency evaluation identifies one or more flight training topics in which the aircraft operator is proficient, and the adjusting the set of recommended flight training topics include removing the one or more identified training topics from the set of recommended flight training topics.

10. The computer-implemented system of claim 7, wherein the one or more characteristics in common includes having operated a particular type or sub-type of aircraft.

11. The computer-implemented system of claim 7, wherein the set of recommended flight training topics is customized based on aircraft operators.

12. The computer-implemented system of claim 7, wherein the adjusting the set of recommended flight training topics based on proficiency evaluation is performed until the proficiency evaluation identifies the set of recommended flight training topics as proficient.

13. A non-transitory computer-readable medium for training aircraft operators, the non-transitory computer-readable medium storing instruction that, when executed by at least one processor, configure the at least one processor to perform a method including:

analyzing, from one or more aircraft systems separate from one or more pilot training systems, sensor data from actual flight data of flights flown by a plurality of aircraft operators to obtain a flight data analysis, wherein the one or more pilot training systems comprises flight training topics identified based on a statistical analysis of trends and are stored in a safety management system, and wherein the sensor data from actual flight data is accessible from a flight recorder on an aircraft during flight operations;

determining a target aircraft operator having one or more characteristics in common with one or more aircraft operators among the plurality of aircraft operators;

determining a set of recommended flight training topics for the target aircraft operator based on the flight data analysis of the one or more aircraft operators that has one or more characteristics in common with the aircraft operator;

providing the determined set of recommended flight training topics for the target aircraft operator to the one or more pilot training systems;

receiving, from the one or more pilot training systems, simulator flight data recorded from simulator training performed by the target aircraft operator;

receiving, from one or more aircraft systems separate from the one or more pilot training systems and during current flight operations, sensor data from actual flight data from operation of aircraft by the target aircraft operator;

analyzing the received simulator flight data and the received actual flight data to identify received simulator flight data and received actual flight data that is related to the set of recommended flight training topics and determine a proficiency evaluation of the aircraft operator, the proficiency evaluation based on a combination of the received simulator flight data and the received actual flight data identified as related to the set of recommended flight training topics and being a measure of proficiency of the target aircraft operator in one or more training topics; and adjusting the determined set of recommended flight training topics for the target aircraft operator, based on the determined proficiency evaluation, so that the one or more pilot training systems is adjusted during flight operations based on the actual flight data of flights flown by the plurality of aircraft operators.

14. The non-transitory computer-readable medium of claim 13, wherein the proficiency evaluation identifies one or more flight training topics in which the aircraft operator is deficient, and the adjusting the set of recommended flight training topics include adding the one or more identified training topics to the set of recommended flight training topics.

15. The non-transitory computer-readable medium of claim 13, wherein the proficiency evaluation identifies one or more flight training topics in which the aircraft operator is proficient, and the adjusting the set of recommended flight training topics include removing the one or more identified training topics from the set of recommended flight training topics.

16. The non-transitory computer-readable medium of claim 13, wherein the one or more characteristics in common includes having operated a particular type or sub-type of aircraft.

17. The non-transitory computer-readable medium of claim 13, wherein the adjusting the set of recommended flight training topics based on proficiency evaluation is performed until the proficiency evaluation identifies the set of recommended flight training topics as proficient.

* * * * *